UNITED STATES PATENT OFFICE.

FRANCIS MUDIE SPENCE AND DAVID DICK SPENCE, OF MANCHESTER, ENGLAND.

MANUFACTURE OF SODA-ALUM.

SPECIFICATION forming part of Letters Patent No. 456,294, dated July 21, 1891.

Application filed November 8, 1890. Serial No. 370,789. (No specimens.)

*To all whom it may concern:*

Be it known that we, FRANCIS MUDIE SPENCE and DAVID DICK SPENCE, manufacturing chemists, both of the Manchester Alum Works, Manchester, in the county of Lancaster, England, have invented certain new and useful Improvements in the Manufacture of Alum, of which the following is a specification.

The practical difficulties in the way of the economical production of soda-alum suitable for the leading use of ordinary alum—viz., the sizing of paper — are well known to alum manufacturers.

Unlike the solution of potash or ammonia alum, a boiling solution of soda-alum of a density of about 60° Twaddle's hydrometer, or 1.3 specific gravity, gives on cooling scarcely any or no crystals, and one which is much above this density, instead of yielding on cooling a crop of well-defined crystals from which the impure "mother-liquor" may readily be drained out, resolves itselves into an opaque, viscid, or cheesy magma.

In the specification of the United States Patent No. 267,610, dated November 14, 1882, granted to Peter Spence and the above-named Francis Mudie Spence for improvements in the manufacture of alum, it was proposed to overcome the above-mentioned difficulties by running the hot strong solution of soda-alum, under prescribed conditions, into a cold saturated solution of soda-alum, and by that means to obtain good crystals free from the cheesy magma above mentioned. It has been found, however, in actual working that the quantity of cold saturated solution of soda-alum required for this purpose is relatively so large—viz., about three times the quantity of the hot solution—as to make it difficult by ordinary means to so regulate the temperature of the whole as to obtain the crop of crystals, and thus the process is rendered unremunerative.

The specification referred to states that if this cheesy magma should happen to be formed it could be made to crystallize by running in more cold liquor and stirring, as it had been found that the most solid magma, if pounded up and mixed with a sufficiency of the cold saturated solution, will gradually change into crystals, but that it is preferable to avoid this mode of working as inconvenient.

The object of the present invention is the formation of a magma which requires no treatment with cold solution, but which on being stirred or turned over will resolve itself into soda-alum crystals and mother-liquor.

According to this invention, we prepare in the usual way from ordinary sulphate of alumina and sulphate of soda, or from alumino-ferric and sulphate of soda, a hot highly-concentrated solution of soda-alum, and we mix with this a smaller proportion, generally one-half the quantity, of cold saturated solution of soda-alum to yield on cooling a magma not too stiff to be freely stirred or turned over.

We find that is practically more economical to use alumino-ferric than a purer sulphate of alumina. We take a solution of alumino-ferric of a strength not exceeding 60° Twaddle, or 1.3 specific gravity, and we dissolve in this the requisite quantity of ordinary commercial salt-cake containing the usual percentage of sulphate of soda, the proportions used being about five parts, by weight, of alumino-ferric cake to one part, by weight, of salt-cake.

We perform the operation in the lead-lined steam dissolving-box used by alum manufacturers. While steam is being blown into this box we run through the box a stream of the alumino-ferric solution, and at the same time we shovel in the salt-cake till the whole of it has been dissolved by the alumino-ferric solution. The solution thus obtained is allowed to flow into a tightly-covered lead-lined tank, in which we allow it to stand until the suspended impurities have been settled out. We allow it to stand about twenty hours. The clear liquid we then run off into a lead-lined evaporator fitted with a coil of lead pipes containing high-pressure steam, and by means of this coil we boil down the solution until it attains a strength of about 90° Twaddle, or 1.45 specific gravity. We then run this boiling liquid into a cold saturated solution of soda-alum prepared in the mode that will be presently described. We run about two parts, by volume, of the hot solution into about one part, by volume, of the cold liquid, taking care to thoroughly mix the two liquids by means of a suitable stirrer. We then run the mixed liquid into a lead-lined cooler of such a depth as will allow the magma that is to be produced to be easily turned over by means of a wooden shovel. We then, by means of a wooden rake, agitate and cool the mixed liquids until the magma has formed, and we then, by means of a wooden shovel, turn the magma over at intervals until it has been brought down to ordinary atmospheric temperature and till it has been transformed into good crystals of soda-alum. The agitation of the mixed liquids necessarily tends to cool them more quickly, and thus to hasten the formation of the magma; but if the mixed liquids are allowed to cool without agitation the magma produced may then be turned over, as above described, until it is transformed into good crystals. We find that by these means the magma is converted within a comparatively short time into good soda-alum crystals, from which the impure mother-liquor may be readily drained out by any well-known means or may be separated by a centrifugal machine. We are thus enabled to obtain in the form of good crystals as large a crop of soda-alum as is obtained by the process specified in the specification of the patent referred to without the serious practical disadvantage which that process involves. We obtain in this way a crop of soda-alum crystals equal to or greater than the weight of the alumino-ferric cake employed to produce it. From the resultant mother-liquor we remove such proportion as will, together with the small portion of iron removed by the alum itself, withdraw all or practically all the iron that was introduced by the hot concentrated solution, and we reserve the remainder of the mother-liquor, which is the "cold saturated solution" already referred to, for mixing with a new increment of hot concentrated solution, as already described. The proportion of mother-liquor withdrawn we utilize either (a) for conversion into potash-alum or ammonia-alum by well-known means, the alumina being readily crystallized out of the solution as potash-alum or ammonia-alum on the addition of the proper potash or ammonia-salts, or (b) we use it either in the liquid form or in the form of a cake for the purification of sewage or other impure waters or for any purpose for which impure aluminous compounds may be employed.

Having fully described our invention, what we claim, and desire to secure by Letters Patent, is—

The improvement in the manufacture of alum, consisting in first preparing from sulphate of alumina and sulphate of soda or from alumino-ferric and sulphate of soda a boiling concentrated solution of soda-alum of a specific gravity of about 1.450, then mixing with this hot solution a smaller quantity of a cold saturated solution of soda-alum sufficient to yield on the cooling of the mixture a magma not too stiff to be freely stirred or turned over, then stirring and cooling the said mixed solution until it is resolved into a magma, then stirring or turning over the magma until it is transformed into crystals of soda-alum and mother-liquor, as herein set forth.

FRANCIS MUDIE SPENCE.
DAVID DICK SPENCE.

Witnesses:
ARTHUR C. HALL,
   9 *Mount Street, Manchester.*
W. T. CHEESHAM,
   18 *St. Ann's Street, Manchester.*